UNITED STATES PATENT OFFICE.

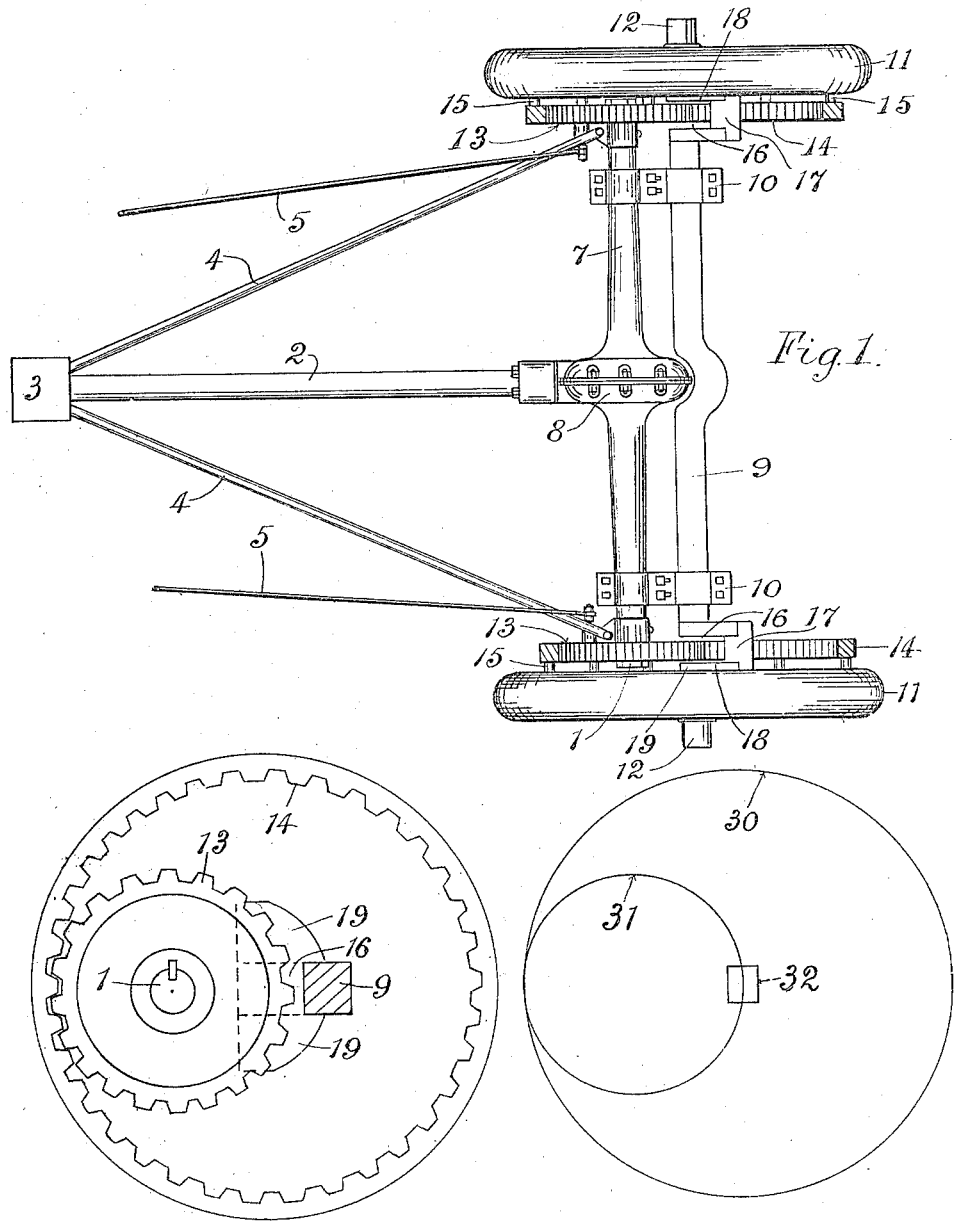

CLIFFORD S. PEETS, OF GREAT NECK STATION, NEW YORK.

SIDE DRIVE FOR AUTOMOBILES.

1,255,783.  Specification of Letters Patent.  Patented Feb. 5, 1918.

Application filed March 8, 1916. Serial No. 82,858.

*To all whom it may concern:*

Be it known that I, CLIFFORD S. PEETS, a citizen of the United States, and resident of Great Neck Station, in the county of Nassau and State of New York, have invented certain new and useful Improvements in Side Drives for Automobiles, of which the following is a specification.

This invention relates to driving gears for commercial automobiles although its usefulness may extend to a wider field. The particular class of vehicle for which my device is designed is that which employs side gears, especially spur gears, to transmit power from transverse drive shafts to rear traction wheels journaled on a "dead" rear axle which carries the weight of the load.

In the internally geared side drives heretofore in vogue for this class of motor vehicles, it has been impossible to use gears having even a ratio of two to one much less gears of a lower ratio because of the interference of the axle of the traction wheels as shown in Fig. 3 wherein 30 and 31 represent the gears and 32 an axle. The periphery of the smaller circle intersects the axis of the larger one, leaving no room for the pinion to turn in.

My principal object is to so construct the side drive that gears having a ratio of two to one and lower can be employed whereby greater speed may be attained, making it possible to use two cog gears within the circumference of the traction wheel in place of the sprockets and chain which have heretofore been employed under such conditions.

And to this end my invention consists in the peculiar features and combinations of parts more fully described hereinafter and pointed out in the claim.

In the accompanying drawings,

Figure 1 represents a top view of the rear portion of an ordinary pleasure automobile in which the wheels have been removed from the "live" axle and transferred to the "dead" rear axle in carrying out my invention, and in which some of the parts are shown in section for the sake of clearness;

Fig. 2 a side view of the internal driving gears employed, and

Fig. 3 an explanatory diagram.

The reference numeral 1 represents the "live" rear axle of an ordinary pleasure automobile. 2 is the longitudinal drive shaft tube and 3 the swivel at its forward end. 4 are braces and 5 brake rods attached to any suitable brake levers. The transverse "live" axle 1 is housed in tubular housing 7 connected to the differential housing 8.

Back of the live axle is a "dead" rear axle 9 which is adapted to carry the load of the vehicle, as when the vehicle has been converted into a truck. This "dead" axle lies parallel to the "live" axle 1 to which it is rigidly held by adjustable clamps 10. Traction wheels 11 are centered on the spindles 12 of the rear axle 9 and are driven by internal gearing consisting of spur pinions 13 fixed on the outer ends of the live axle 1, on which wheels were previously keyed, and meshing with internal gears 14 fastened to the inside of the traction wheels by bolts 15. The internal gears 14 encircle the rear axle 9. The ratio of the gears is such that the diameter of the gear 13, preferably exceeds in length the radius of the gear 14. This ratio is made possible through the medium of recesses 16 in the rear axle which permit the periphery of the driving pinions 13 to intersect the axis of the traction wheels without clashing. These recesses are provided by forming offsets 17 in the axle 9.

The transverse recess 16 for the pinions should be located as near the shoulders of the spindles 12 as practicable in order to bring the gears closer to the sides of the traction wheels and thereby reduce the width of the overhang. To accomplish this end I give the outer vertical side-walls 18 of each recess about one-half the thickness of the diameter of the axle and make up the deficiency in metal by providing integral vertical strengthening webs 19 extending above and below the longitudinal sides of the axle.

When thus constructed it is seen that the rotation of the driving pinion 13 in the proper direction will actuate the internal gears which, being fixed to the traction wheel, will propel the vehicle forward.

It is obvious that my invention is susceptible of a great many variations that might suggest themselves to a skilled mechanic; therefore I do not limit myself to the specific form herein shown but consider myself entitled to all such modifications.

Having thus described the preferred form of my device, what I claim and desire to secure by Letters Patent is:

A side drive for motor vehicles comprising a live axle provided with an end pinion adapted to mesh with and drive an internal gear carried by a traction wheel, and a dead axle having an end spindle to receive said wheel, said dead axle having a lateral offset adjacent to said spindle forming a recess receiving said pinion, the outer leg of said offset being of reduced thickness and formed with side strengthening webs.

Signed at the city of New York, in the county of New York and State of New York, this 3rd day of March, A. D. 1916.

CLIFFORD S. PEETS.

Witnesses:
O. D. SCHONNARD,
R. S. DuBois.